United States Patent [19] [11] 4,057,718
Svensson [45] Nov. 8, 1977

[54] ARRANGEMENT FOR SUPPORTING LIGHTING FITTINGS AND THE LIKE

[76] Inventor: Lars David Svensson, Vikingavagen 112, Taby, Sweden, S-183 43

[21] Appl. No.: 685,789

[22] Filed: May 13, 1976

[51] Int. Cl.[2] ..................... F21V 21/00; H02G 7/20

[52] U.S. Cl. ..................... 362/249; 174/43; 191/41; 248/64; 404/1; 362/391

[58] Field of Search ............... 174/40 R, 41, 43, 45 R; 52/28, 40, 98, 99, 301; 191/40, 41; 240/9 R, 25, 52 HT, 84; 248/61, 64; 104/112, 115, 123-125; 404/1, 10

[56] References Cited

U.S. PATENT DOCUMENTS

| | | | |
|---|---|---|---|
| 2,237,597 | 4/1941 | Fisher | 248/64 X |
| 3,033,978 | 5/1962 | Van Dusen, Jr. | 240/9 R X |
| 3,853,418 | 12/1974 | Druin et al. | 52/98 X |

*Primary Examiner*—Laramie E. Askin
*Attorney, Agent, or Firm*—Karl W. Flocks

[57] ABSTRACT

This invention relates to an arrangement for suspending lighting fittings and the like along or at traffic-routes and the like, comprising lines carried by standards and intended to carry or support the lighting fittings. The novelty lies in that the standards and the lines form two separate systems, wherein the line system is continuous along the traffic-route and releasably connected to the standard system so that the line system substantially remains in its elevated position even if part of the standard system is removed on e.g. a standard being struck by a vehicle.

9 Claims, 3 Drawing Figures

FIG. 1

ARRANGEMENT FOR SUPPORTING LIGHTING FITTINGS AND THE LIKE

The present invention relates to an arrangement for supporting lighting fittings and the like along traffic-routes and similar areas, the arrangement including lines strung up between standards and intended to directly or indirectly carry and/or support the lighting fittings.

By way of introduction, there will now be given a short account of different types of standards used in conjunction with the lighting of traffic-routes etc.

Such standards may be substantially divided into three different groups; namely park standards, side mounting standards and central suspension standards.

Park standards are light-weight masts of a height of up to 6 m which directly support the lighting fittings. These standards do not normally constitute a barrier which is dangerous to life in the event of being struck by a vehicle.

Side mounting standards are standards which directly support one or more lighting fittings. They are erected at heights of up to 15 m and weigh up to 500 kg. Standards of a height of 10 m are perhaps the most common in service for street lighting and have a weight of about 150 kg. Side mounting standards are well-suited as "soft standards" for reducing the risks in the event of a collision. However, in the case of high standards with the resulting increase of weight, the retardation of a vehicle striking the standard will increase not only because of the fact that more material is to be plastically deformed but also because more energy is consumed to accelerate the standard to the speed of the vehicle.

In central suspension standards, the fittings are suspended from lines which are as a rule strung up between the standards transversely of the street.

The present invention relates more precisely to the third group of standards, that is to say, standards which support a line system which, in turn, support the lighting fittings.

Apart from being influenced by the wind load, a central suspension standard is also influenced by the tension from the suspension line. Consequently, an inward stress moment approximately 3 to 5 times greater than that exerted upon the largest side mounting standards will be applied to central suspension standards. In order to reduce the great inward stress moment, the force from the suspension line is occasionally conducted down into the earth by means of a stay. The standard will then be of dimensions which correspond to those of the largest side mounting standards. The standard will in this case be dimensioned for wind parallel to the road as a wind-loaded cantilever beam.

If a central suspension standard were to be designed as a "soft" mast in order to reduce the collision danger, this system would be possessed of two disadvantages. When the standard collapses, the fittings and fitting lines would be pulled down onto the traffic-route and constitute a new traffic hazard. Furthermore, the automobile would, under the duration of the collision, be forced to accelerate the standard up to its own speed, which causes a powerful retardation in the first phase of the collision cycle.

A major aspect of the present invention is to provide a load-carrying arrangement, the load preferably consisting of the dead weight of lighting fittings, suspension lines and the like for the fittings, but also including the wind load and similar external stresses, for example, ice and snow, the load-bearing arrangment including carrying standards and the above-mentioned line system. Furthermore, the arrangement shall be of such a design that the line system suspending the fittings will remain in substantially unchanged position despite the failure of one or more of the supporting standards, for example, as a result of a collision.

A further aspect of the present invention is to provide arrangement which, in installations which would normally require conventional suspension standards, permits the use of standards which, in the event of a collision, do not result in serious personal injury and, because of their design, provide a technically safer and more robust construction and lower material and installation costs.

According to the invention, the arrangement is divided into two systems which co-operate under normal loading conditions; namely, a standard system and a continuous line system, this latter carrying and supporting the lighting fittings, and the standard system which, under normal conditions, carries and supports the line system, is releasably connected to the line system which is substantially fixedly disposed in the horizontal plane relative to the standard system but is supported in such a way as to be released from the upper portion of a standard in the event of a downward movement of the standard. Furthermore, the line system is so designed as to be capable of substantially retaining its position above the traffic-route despite the failure of individual standards.

The primary difference between this novel arrangement and that which is previously known in conjunction with installations with suspension standards and line-suspended fittings is that the line system carrying the fittings forms a unit which can be separated from the supporting system formed by the standards. The essential feature here is that at least the lines carrying the fittings are carried or supported by the standard system in such a way that if one or more of the standards were to be struck by a vehicle and pulled down, the line system would remain at a safe height above the traffic-route.

Embodiments of the arrangement according to the invention will be described in greater detail hereinbelow with reference to the accompanying drawing, in which.

In its simplest embodiment, the arrangement comprises a row of standards preferably of the type which easily gives way in the event of being struck in a collision. A bracket for a suspension line is mounted at the upper end of these standards. The suspension line carries, in its turn, the lighting fittings. The bracket is to be of such a nature as to be retained on the standard by gravity and can consist of a cap-like means which is fitted on the upper end of the standard or can be a body inserted into an at least partially hollow standard. If a standard is struck by an automobile and thereby knocked over, the engagement between the standard and the bracket will cease, the suspension line sagging only slightly, according as the distance between the support points of the line (i.e. the standards remaining on either side of the falling standard), increases. Consequently, the risk that the fittings and their suspension lines will fall onto the subjacent traffic-route and cause accidents in the aftermath of the first is eliminated.

Figure 1:
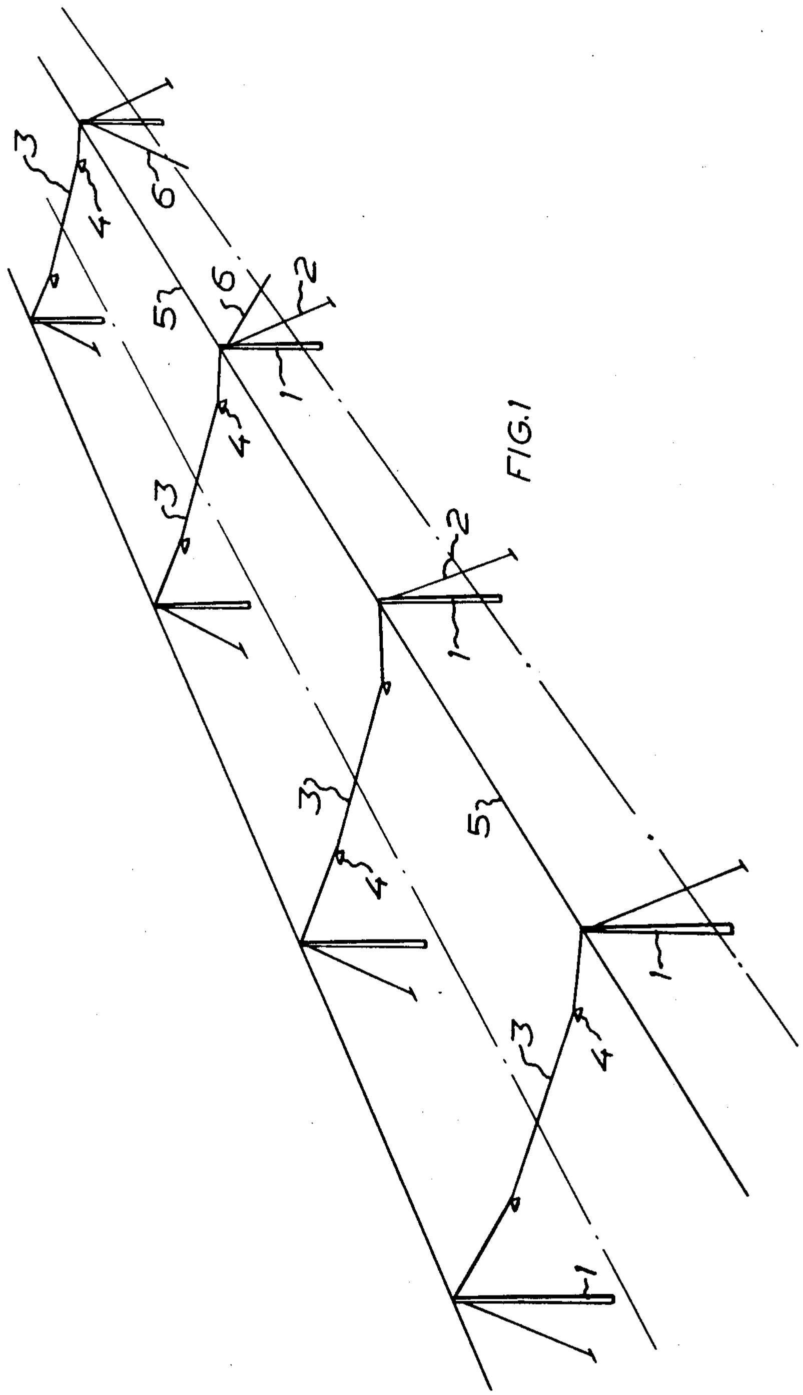
FIG. 1 shows schematically and in perspective the construction of a standard and line system for carrying fittings above a traffic-route, the lines carrying the fittings extending transversely of the traffic-route.
Figure 2:
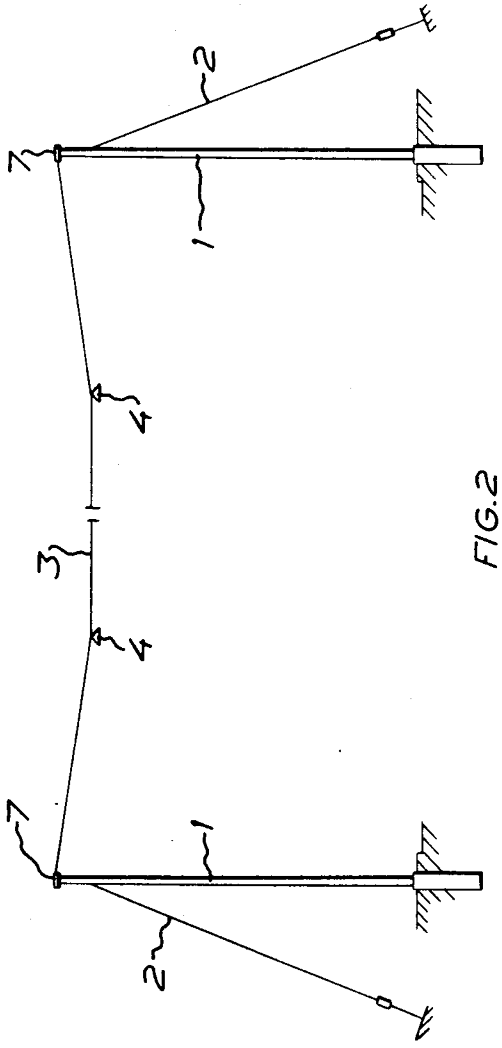
FIG. 2 shows on a larger scale, a pair of standards according to FIG. 1 with lines, seen in the longitudinal direction of the traffic-route.

In the embodiment shown in FIGS. 1 and 2 (which can rather be compared to a conventional suspension line system) it was decided to place the standards, designated 1, outside the traffic-routes, it being possible to suspend the lighting fittings 4 directly above the respective traffic-routes of a motorway or the like.

The standards 1 are disposed in pairs and consist of light, relatively pliable standards, thus allowing for cheap foundations. The foundation will be dimensioned to all intents and purposes only for the overhead loading. The standards are provided with stays 2 which are fixed a distance from the top of the standard without connection to the line system.

The line system comprises transverse suspension lines 3 which carry fittings 4, and longitudinal stabilisation lines 5 which may carry current supply cables. The transverse lines 3 are connected to the longitudinal lines and form together with them the continuous line system.

The longitudinal lines can, with suitable spacing, be stayed in the longitudinal direction by means of stays 6 which, like the stays 2, can be fixed to the standards 1 without any other connection to the line system.

Figure 3:
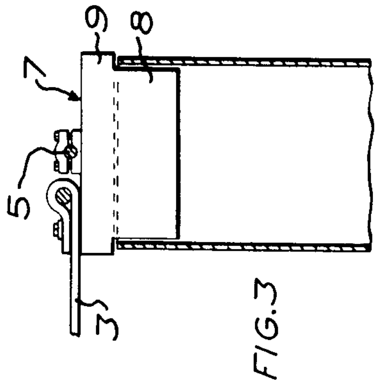
FIG. 3 shows on a still larger scale, the upper end of one of the standards shown in FIGS. 1 or 2 with a bracket for the suspension line mounted thereon.

Retainer means or brackets 7 are mounted on each one of the standards and may also serve as connection members between the transverse and longitudinal lines 3 and 5, respectively. Moreover, the retainer means or brackets are designed such that they are retained on the standards by their dead weight and the weight of the line system. In the embodiment shown in FIG. 3, the retainer means or brackets 7 consists of a plug with a portion 8 which penetrates into the upper end of the standard 1, and a portion formed as a head 9 and provided with attachment devices for the line system.

The retainer means or brackets 7 carry the line system and prevent movement thereof in the horizontal plane, but are fixed on the standard such that if a standard were to be shattered and/or knocked over, they would come loose from the standard.

Naturally, if support from a standard is lost at any point, the line system will sag somewhat at the point in question. However, the system will not sag so much that the fittings come into the vicinity of the area intended for the traffic. Not even if two or even more standards were to be eliminated would the line system cause a traffic hindrance.

Naturally, the retainer means can also be designed in another fashion. As was mentioned above, it is possible to design the retainer means as a cap which is passed over the end of the standard instead of being a plug inserted into the end of the standard. It is also possible to place the line loose in a saddle at the top of the standard.

Among the advantages inherent in the present invention, mention can be made of the following:

The standards 1 function as swaying columns or as cantilever beams articulated at the supported end. Consequently, the standards can be dimensioned for a moment which is 1/4 of the moment of a conventionally stayed standard; however, in a combination with the normal force from a stay. This results in standards which correspond, in pliability, to the shorter side mounting standards, thus enhancing road-safety in the event of a collision.

The pliable standards provide an economic saving both as regards material and mounting.

The small stress moments entail cheap foundation laying.

In the embodiment described above, damaged standards can easily be replaced without the necessity of carrying out any work on the line system. The longitudinal lines can support electric cables.

Cables in combination with a suspension line in the longitudinal direction of the traffic-route are considerably cheaper than underground cables both as regards material and installation. Furthermore, the electrical system can be separated entirely from the supporting system, thus obviating the necessity of carrying out any work to the electrical system in the event of damage to, or replacement of, standards. The risk that standards and fallen stays can become "live" is thereby also reduced.

The invention should not be considered as restricted to that described above and shown in the drawings but may be modified in a number of ways within the spirit and scope of the appended claims.

What I claim and desire to secure by Letters Patent is:

1. An arrangement for suspending lighting fittings or the like comprising a system of standards erected along a traffic-route or like area including a plurality of standards in at least one row having one or more intermediate individual standards between individual standards at opposite ends of the row and a continuous line system including means stringing lighting fittings mounted on top of said systems of standards, each intermediate standard of said system of standards being individually releasable from said means and disconnected from said line system when such an intermediate standard is moved downwardly; said line system being retained substantially in a horizontal plane above the traffic-route by other standards of said system of standards despite failure of an intermediate individual standard.

2. The arrangement of claim 1, wherein the standards included in said standard system are of the type which gives way in the event of being struck in a collision.

3. The arrangement of claim 1, wherein said continuous line system comprises at least one line which extends across a row of standards and is releasably mounted thereon.

4. The arrangement of claim 1, wherein the continuous line system includes suspension lines carrying said lighting fittings and stabilizing lines oriented transversely relatively to the suspension lines and connected thereto to form together therewith the continuous line system releasably mounted in relation to at least two rows of standards.

5. The arrangement of claim 4, wherein said suspension lines carrying said lighting fittings extend substantially transversely of the traffic-route or the like and are connected to said stabilizing lines which extend along a row of standards on either side of said traffic-route, and wherein the continuous line system comprising the suspension lines and stabilizing lines is releasably supported in the upward direction by said standards adjacent the points of intersection between said suspension lines and said stabilizing lines.

6. The arrangement of claim 1, wherein said continuous line system is releasably mounted on said standards in such a way that said continuous line system is fixed in the horizontal plane and is retained on said standards only by dead weight.

7. The arrangement of claim 1, wherein said continuous line system is provided with retainer means in the form of plugs or the like which are mounted on the end of a standard.

8. The arrangement of claim 1, wherein said standards are provided with stays which lack connection to said continuous line system.

9. The arrangement of claim 1, wherein said standards are so-called "soft" standards, i.e. standards which in the event of being struck in a collision give way and fall.

* * * * *